(12) United States Patent
Woodward et al.

(10) Patent No.: US 12,695,509 B2
(45) Date of Patent: Jul. 28, 2026

(54) OPTICAL DEVICE, QUANTUM COMMUNICATION SYSTEMS AND QUANTUM COMMUNICATION METHODS

(71) Applicant: Kabushiki Kaisha Toshiba, Tokyo (JP)

(72) Inventors: Robert Ian Woodward, Cambridge (GB); Mirko Pittaluga, Cambridge (GB); James F. Dynes, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 18/428,131

(22) Filed: Jan. 31, 2024

(65) Prior Publication Data

US 2025/0047385 A1 Feb. 6, 2025

(30) Foreign Application Priority Data

Aug. 4, 2023 (GB) ................................... 2311992.8

(51) Int. Cl.
H04B 10/2581 (2013.01)
H04B 10/70 (2013.01)
(Continued)

(52) U.S. Cl.
CPC ......... H04B 10/2581 (2013.01); H04B 10/70 (2013.01); H04J 14/02 (2013.01); H04L 9/0852 (2013.01)

(58) Field of Classification Search
CPC ..... H04B 10/2581; H04B 10/70; H04J 14/02; H04L 9/0852; G02B 6/14
See application file for complete search history.

(56) References Cited

U.S. PATENT DOCUMENTS

| | | | |
|---|---|---|---|
| 6,185,346 B1 | 2/2001 | Asawa et al. | |
| 8,755,525 B2 * | 6/2014 | Wiseman | H04L 9/0852 |
| | | | 380/278 |

(Continued)

FOREIGN PATENT DOCUMENTS

| | | |
|---|---|---|
| CN | 210839585 U | 6/2020 |
| EP | 2 579 483 A1 | 4/2013 |

(Continued)

OTHER PUBLICATIONS

Combined United Kingdom Search Report and Examination Report issued Feb. 6, 2024 in United Kingdom Patent Application No. GB2311992.8, 7 pages.

(Continued)

*Primary Examiner* — Hibret A Woldekidan
(74) *Attorney, Agent, or Firm* — Oblon, McClelland, Maier & Neustadt, L.L.P.

(57) ABSTRACT

An optical communication system comprises a transmitter optically coupled to a single-mode optical channel, and a multimode optical fibre configured to support transmission of a plurality of guided modes. The plurality of guided modes comprises a target mode. The system further comprises an optical mode converter configured to optically couple the mode of the channel to the target mode of the multimode fibre by gradually changing a transverse profile of propagating light received from the channel to match a transverse profile of the target mode of the multimode fibre.

15 Claims, 8 Drawing Sheets

(51) Int. Cl.
  *H04J 14/02* (2006.01)
  *H04L 9/08* (2006.01)

(56) References Cited

U.S. PATENT DOCUMENTS

| | | | | |
|---|---|---|---|---|
| 8,885,828 | B2 * | 11/2014 | Wiseman | H04L 9/065 |
| | | | | 380/278 |
| 9,800,352 | B2 | 10/2017 | Frohlich et al. | |
| 10,197,737 | B2 * | 2/2019 | Lin | G02B 5/18 |
| 2005/0025416 | A1 * | 2/2005 | Hallemeier | G02B 6/14 |
| | | | | 385/24 |
| 2006/0051017 | A1 | 3/2006 | Hallemeier et al. | |
| 2008/0267559 | A1 * | 10/2008 | De Barros | G02B 6/02023 |
| | | | | 385/28 |
| 2010/0329671 | A1 | 12/2010 | Essiambre et al. | |
| 2016/0233964 | A1 | 8/2016 | Frohlich et al. | |
| 2019/0212761 | A1 * | 7/2019 | Swanson | A61B 5/0075 |
| 2020/0333535 | A1 | 10/2020 | Tsang et al. | |
| 2021/0013985 | A1 * | 1/2021 | Shibahara | H04B 10/2581 |
| 2022/0029729 | A1 | 1/2022 | Guo et al. | |
| 2023/0275752 | A1 | 8/2023 | Woodward et al. | |

FOREIGN PATENT DOCUMENTS

| | | | |
|---|---|---|---|
| JP | 2012-531812 | A | 12/2012 |
| JP | 2016-144206 | A | 8/2016 |
| JP | 2017-152985 | A | 8/2017 |
| JP | 2022-526209 | A | 5/2022 |
| JP | 2023-124773 | A | 9/2023 |
| WO | WO 2013/160902 | A1 | 10/2013 |

OTHER PUBLICATIONS

Japanese Decision to Grant issued on Mar. 18, 2025 in Japanese Patent Application No. 2024-027655 (with unedited computer-generated English translation), 5 pages.

Namekata et al., "Quantum key distribution over an installed multimode optical fiber local area network", Optics Express 13, 9961, 2005, 9 pages.

Amitonova et al., "Quantum key establishment via a multimode fiber", Optics Express 28, 5965 2020, 17 pages.

* cited by examiner

Mode Group          Modes within Group          Mode Profiles

1                              $LP_{01}$

2                       $LP_{11a}$, $LP_{11b}$

3                    $LP_{02}$ , $LP_{21a}LP_{21b}$

31

71

73₁

73₂

73₁ to 73ₙ

73₃

73₄

75

OPTICAL DEVICE, QUANTUM COMMUNICATION SYSTEMS AND QUANTUM COMMUNICATION METHODS

CROSS REFERENCE

This application claims priority from UK application number 2311992.8, the contents of which are herein incorporated by reference.

TECHNICAL FIELD

Embodiments described herein relate to optical devices, quantum communication systems and quantum communication methods.

BACKGROUND

In a quantum communication system, information is sent between a transmitter and a receiver by encoded single quanta, such as single photons. Each photon carries one bit of information encoded upon a property of the photon, such as its polarization, phase or energy/time. A quantum communication system may be used to implement quantum key distribution (QKD) which is a technique for sharing of cryptographic keys between two parties; a transmitter, often referred to as "Alice", and a receiver, often referred to as "Bob". The attraction of this technique is that it provides a test of whether any part of the key can be known to an unauthorised eavesdropper, often referred to as "Eve".

A QKD protocol typically involves two steps. First, Alice sends quantum information to Bob through a quantum channel, then, during a post-processing stage, Alice and Bob communicate with each other through a classical channel to establish the shared key. In practice, the quantum and classical channel are frequently implemented with single-mode optical fibres. An example of a known single QKD communication system is illustrated in FIG. 1. The system includes a QKD transmitter (Alice) that is connected via two single-mode fibres to a QKD receiver (Bob). The QKD transmitter includes a "quantum transmitter", i.e. a unit to encode quantum states into optical signals and to transmit the encoded signals through the first single mode fibre to Bob who performs quantum state measurements on the received signals. Alice and Bob each control a classical communication module connected to the second single-mode fibre to perform classical (two-way) communication during the post-processing stage.

While single-mode fibres are widely deployed for today's optical communications, multimode fibre networks are not only still in active use but are continued to be actively developed and deployed for various use cases. Conventional QKD technologies (e.g. QKD transmitter and receiver such as shown in FIG. 1) are, however, not suitable for use with multimode optical fibres.

BRIEF DESCRIPTION OF THE DRAWINGS

Embodiments of the invention will now be described, by way of example only, with reference to the accompanying schematic drawings, in which.

To avoid unnecessary repetition, like reference numerals will be used to denote like features in the figures.

DETAILED DESCRIPTION

Figure 1:
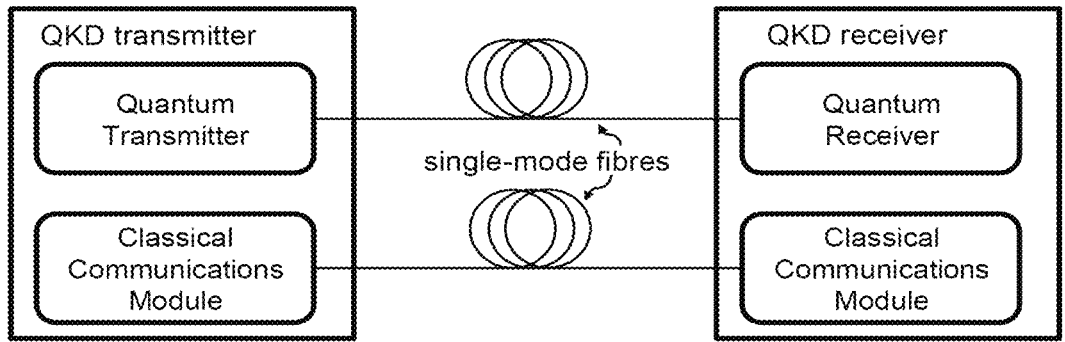
FIG. 1 shows a known QKD communication system.

The present disclosure aims to provide new and useful optical devices for implementing quantum communication over multimode optical fibres, i.e. over an optical fibre which supports a plurality of guided modes (at a certain operating wavelength).

In an embodiment, an optical communication system is provided. The optical communication system comprises a transmitter (e.g. a quantum transmitter or classical communication device) optically coupled to a single-mode optical channel (e.g. a single-mode fibre), and a multimode optical fibre configured to support transmission of a plurality of guided modes. The plurality of guided modes comprises a target mode (e.g. a fundamental mode of the multimode fibre). The optical communication system further comprises an optical mode converter configured to optically couple the mode of the channel to the target mode of the multimode fibre by gradually changing a transverse profile of propagating light received from the channel to match a transverse profile of the target mode of the multimode fibre.

The disclosed system provides an improved optical communication system. Specifically, the disclosed system makes it possible to launch optical signals (by providing the signals to the single-mode channel) into a multimode fibre such that the signals can be robustly transmitted over the multimode fibre (i.e. without significant signal and/or phase distortions). This is achieved by converting the input mode to match the mode profile of the target mode of the multimode fibre which ensures coupling of the signal to (substantially) only one mode of the multimode fibre. During propagation through the fibre, the signal may couple to other modes that have approximately the same propagation constant but coupling to modes with different propagation constants is suppressed which enables transmission through the fibre with any substantial distortions because the signal In an embodiment, gradually changing the transverse profile of light received from the channel may mean that the transverse profile of light propagating through the optical mode converter has a different transverse extent at three or more equidistantly spaced positions along an optical path of the optical converter.

In an embodiment, the optical mode converter may be configured to optically couple the mode of the channel to the target mode of the multimode fibre with a selectivity of at least 5 dB.

In an embodiment, the optical communication system may be configured to transmit a plurality of signals using wavelength division multiplexing. The plurality of wavelength division multiplexed signals may comprise quantum signals having a first wavelength and classical signals having a different wavelength.

In an embodiment, the optical communication system of any preceding claim may further comprises a receiver optically coupled to a second single-mode optical channel, and a second optical mode converter configured to optically couple the mode of the second channel to the target mode of multimode fibre by gradually changing a transverse profile of propagating light received from the target mode of the multimode fibre to match a transverse profile of the second channel. The transmitter may be a quantum transmitter configured to provide quantum signals, the receiver may be a quantum receiver comprising at least one detector configured to detect quantum signals, and the optical communication system may be configured to implement a quantum key distribution protocol.

In an embodiment, the plurality of modes may comprise a first and a second group of guided modes. The first group may comprise the target mode. The system may further comprise a second transmitter optically coupled to a second single-mode optical channel. The optical mode converter may further be configured to optically couple the mode of the second channel to a mode of the second group of modes of the multimode fibre such that the optical channels are optically coupled to modes of different groups of guided modes of the multimode fibre. A coupling between modes of the same mode group may be stronger than a coupling between modes of the different mode groups.

The above enables an improved way of multiplexing optical signals so that the multiplexed optical signals can be robustly transmitted over a multimode fibre (e.g. for efficiently implementing QKD protocols). This is achieved by grouping the modes of the multimode fibre according to their propagation constant such that the modes within each group are (nearly-) degenerate (i.e. these modes have approximately the same propagation constant) but modes in different groups are non-degenerate (i.e. these modes have the different propagation constants), and by coupling the optical channels to the modes of different mode groups such that each channel is coupled to one or more modes of a different group of modes. Signal and/or phase distortions are strongly reduced because coupling between modes of the different mode groups is (sufficiently) low. By coupling the signals emitted by a particular transmitter only to modes of a corresponding mode group, signal and/or phase distortions are strongly reduced and the performance of the system is improved (for example, when one transmitter is a quantum transmitter and the system implements a QKD protocol, the distance over which QKD can be implemented is improved). Further, compared to conventional systems that rely on wavelength division multiplexing to implement multiple channels in the same optical fibre, the disclosed system may reduce the spectral bandwidth utilisation of the multimode fibre by employing mode group division multiplexing (i.e. using different mode groups for different channels). Because the coupling of modes of different mode groups is intrinsically low, mode group division multiplexing provides a robust way of transmitting multiple channels over multimode fibres without significant coupling between the channels. Further, noise in such a channel (for example, optical scattering noise caused by another channel) is reduced when the channels are multiplexed by mode group division multiplexing (because the mode profiles of the modes carrying the signal of one channel and the modes carrying the signal of another channel overlap only partially).

In an embodiment, the guided modes of the multimode fibre may be linearly polarized modes characterised by an azimuthal order v and a radial order p. The modes of the first mode group may be associated with a first mode number, the modes of the second mode group may be associated with a second mode number different from the first mode number, and the respective mode numbers may satisfy the equation $m=v+2\mu+1$.

In an embodiment, a relative difference between propagation constants of any two modes of the same mode group may be equal to or less than 0.02%.

In an embodiment, the first transmitter may be a quantum transmitter configured to provide quantum signals and comprising a pulsed laser, and the second transmitter may be a classical communication device.

In an embodiment, the optical communication system may further comprise one or more further transmitters. Each optically may be coupled to a further single-mode optical channel.

The multimode optical fibre may be further configured to support transmission of corresponding one or more groups of guided modes, and the optical mode converter may be configured to optically couple each further channel to modes of different groups of guided modes of the multimode fibre.

In an embodiment, the optical communication system may further comprise for each transmitter a corresponding receiver optically coupled to a respective single-mode optical channel, and a second optical mode converter configured to optically couple the modes of the optical channels coupled to the transmitters to modes of different groups of guided modes of the multimode fibre so that each transmitter may receive optical signals from the corresponding transmitter.

In an embodiment, the optical communication system may be configured to implement a quantum key distribution protocol. The classical communication device and the corresponding receiver may be configured to exchange data signals for deriving a shared encryption key. One of the one or more further transmitters may be a second classical communication device configured to transmit a reference signal to the corresponding receiver configured to process the received reference signal to adjust a setting of the quantum transmitter. The quantum transmitter may be configured to provide quantum states based on the adjusted setting.

In an embodiment, the target mode may be a fundamental mode of the multimode fibre.

In an embodiment, the optical mode converter may comprise a tapered waveguide or a tapered waveguide array or micro-optic lenses.

In an embodiment, the multimode fibre may be one of a step-index multimode fibre, a graded-index multimode fibre, a hollow core fibre, or a micro-structured optical fibre.

Figure 3:
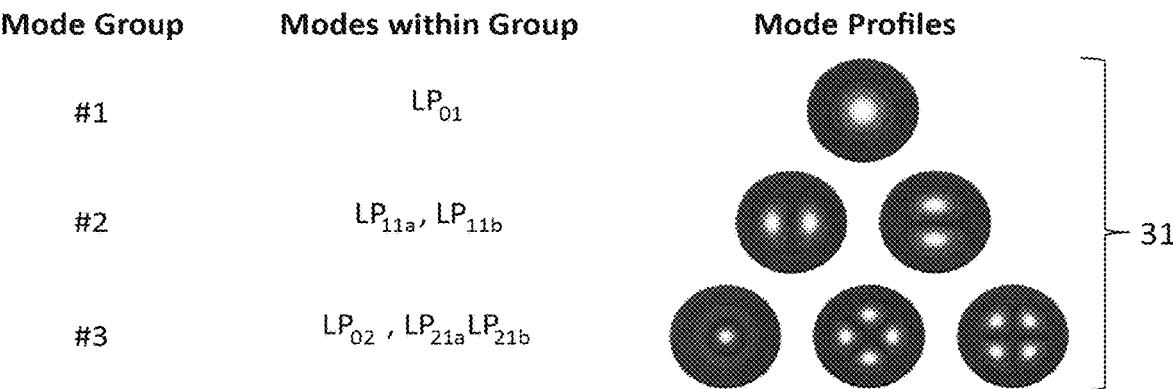
FIG. 3 illustrates modes of a multimode fibre.
Figure 4:
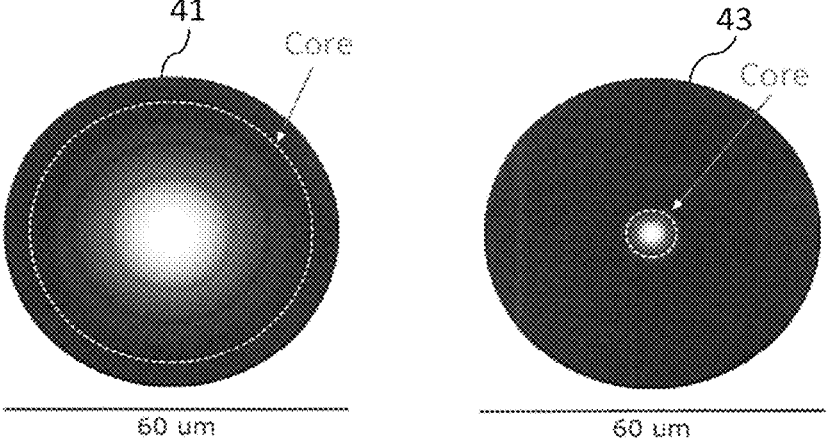
FIG. 4 illustrates modes of a multimode fibre and a single mode fibre.

An example quantum communication system 1 is described with reference to FIGS. 2 to 4. In general, the quantum communication system 1 is suitable for implementing QKD protocols over multimode fibres. For example, the quantum communication system may be used to implement a BB84 protocol [C. H. Bennett and G. Brassard, *Proc. of IEEE Int. Conf. on Comp. Sys. Sign. Process.* (IEEE, New York, 1984), pp. 175-179] or a distributed phase reference protocol (such as a coherent one-way protocol or a differential-phase-shift protocol). The quantum communication system 1 may be operated at a telecom wavelength, for example at a wavelength of 1550 nm.

The communication system 1 comprises a transmitter device 3 configured to transmit quantum signals to a receiver device 7 via a multimode optical fibre 5. The multimode fibre 5 is typically long, e.g. longer than 100 m, longer than 1 km, or longer than 10 km. As an example, the multimode fibre 5 may be part of a fibre optic Local Area Network. In broad terms, the multimode fibre 5 supports transmission of several spatial modes in the same waveguide. For example, the multimode fibre 5 may support transmission of more than 10 or more than 30 guided modes. The multimode fibre 5 may of any suitable type, for example the multimode fibre 5 may be a step-index multimode fibre, a graded-index multimode fibre, a hollow core fibre, or a micro-structured optical fibre (e.g. a photonic crystal fibre). Step-index or graded-index multimode fibres typically comprise a large, high-refractive-index core surrounded by a lower index cladding region. The cladding may have a diameter of 125 μm and a core diameter between 50 to 100 μm but this is only an example.

Light can only propagate in a multimode fibre in a finite number of possible patterns, commonly referred to as "modes". The physical distribution of electromagnetic field is different for each mode and thus, each mode has different optical properties (dispersion, loss, mode-field area, nonlinearity, etc.). FIG. 3 shows an illustration of the "mode profiles" 31 of the first six of these modes for a typical graded-index multimode fibre, referred to as $LP_{01}$, $LP_{11a}$, $LP_{11b}$, $LP_{02}$, $LP_{21a}$, and $LP_{21b}$, (where LP stands for linearly polarized). The linearly polarized modes $LP_{v\mu}$ are commonly described by their azimuthal order v and their radial order μ. As shown in FIG. 3, the different LP modes have different mode profiles (i.e. different radial electric distributions), although there may be some overlap.

In general, LP modes are paraxial solutions (propagating approximately parallel to the fibre axis) of the wave equation in the optical fibre. These solutions exist in the limit of a weakly guiding waveguide where the index of refraction difference between core and cladding is small. Each mode has two orthogonal states of polarisation (e.g. $LP_{01}$ horizontal and $LP_{01}$ vertical). The $LP_{01}$ mode is also referred to as the fundamental mode of the optical multimode fibre.

Conventional quantum communication transmitters and receivers (for example the devices shown in FIG. 1) are intended for use with single-mode fibres (i.e. fibres that support only one guided mode at the operating wavelength). These devices, when connected to a multimode fibre, typically couple to large number of modes of the multimode fibre. This is because the mode of a conventional single mode fibre has a significantly different mode profile compared to the modes of the multimode fibre. In particular, the mode profile of the mode of a single mode fibre is typically concentrated over a much smaller area than the modes of a multimode fibre. This is illustrated in FIG. 4 which shows the mode profile 41 of the LP01 mode of a typical multimode fibre (with a core diameter of 50 μm) and the mode profile 43 of the LP01 mode of a typical single-mode fibre (with a core diameter of 9 μm). The white dotted lines in FIG. 4 indicate the core-cladding boundary. In this example, the mode-field diameter of the LP01 mode of the multimode fibre is approximately 33 μm while is mode-field diameter of the mode of the single mode fibre is only 9.5 μm. In general, the mode of a single-mode fibre has (some) overlap with a large number of modes of the multimode fibre causing a conventional quantum transmitter to excite all of these modes.

Spreading optical signals by exciting multiple modes may cause signal distortions. This is because, in general, each mode has different properties, e.g. different dispersion properties, which means that the optical signal is distorted as it propagates in the fibre. Such distortions are problematic for direct detection optical communication (where the pulse amplitude is used to encode information) as well as for quantum communication. For example, a pulse may spread out (also referred to as "intermodal dispersion") and at high bit rates or long distances, start to spread into each other which makes them indistinguishable (this issue is also known as "intersymbol interference"). This results in errors when the light is measured and decoded by the receiver. Such multimode excitation can further disturb the phase of the optical pulse since each mode experiences (in general) a different phase delay and at the output of the multimode fibre the modes can interfere resulting in a noisy signal. In quantum communication (e.g. in QKD), such phase noise in particularly problematic since quantum communication protocols often rely on a well-controlled phase of the optical pulse. The optical devices described below enable conventional QKD transmitters/receivers to launch/receive optical signals into/from a multimode optical fibre with in a distortion-free way. As described in detail below, the quantum communication system 1 of FIG. 2 achieves this by providing the optical mode converters 11, 13, 17, 19.

In general, the modes of the multimode fibre 5 can be grouped into "mode groups" based on their respective propagation constant (i.e. based on an effective refractive index experienced by a particular mode)—or, equivalently, the modes can be grouped based on their respective group delay (i.e. based on the time delay that a light pulses experience when propagating in a particular mode). In particular, the modes can be grouped such that modes belonging to the same group are (nearly) degenerate, i.e. these modes have approximately identical propagation constants and group delays. Consequently, modes within a mode group are well phase matched, i.e. light pulses propagating in these modes acquire the same optical phase shift. In practice it has been found that light propagating in a particular mode can (strongly) couple to other modes in the same mode group during propagation. For example, as shown in FIG. 3, a first mode group may consist of (only) the $LP_{01}$ mode, a second mode group may consist of the $LP_{11a}$ and the $LP_{11b}$ mode, a third mode group may consist of the $LP_{02}$, the $LP_{21a}$, and the $LP_{21b}$ mode, and so on (it is understood that each of these modes has two orthogonal states of polarisation).

Modes in different mode groups have different propagation constants and group delays. Thus, modes in different modes groups are not well phase matched. Further, the coupling between modes from different groups is low (e.g. significantly lower than the coupling between modes of the same mode group). Thus, because coupling between modes belonging to different mode groups in low, it is possible to transmit (classical or quantum) signals over a multimode fibre without causing signal distortions by exciting only modes belonging to the same mode group. As described in detail below, it is further possible to perform "mode group division multiplexing", i.e. to encode different signals into different mode groups.

In broad terms, the aforementioned mode groups may be determined by symmetry properties of the multimode fibre 5. It is understood that small deviations from a targeted symmetry (for example when the transverse cross section of the fibre is not perfectly round but slightly elliptical) may break the degeneracy of otherwise degenerate modes. It is understood that for the purpose of the present disclosure, complete mode degeneracy is not required and that minor differences in the propagation constants of modes of the same mode group may be acceptable.

For example, it is known that (although not necessarily degenerate) all linearly polarized modes $LP_{v\mu}$ (described by their azimuthal order v and their radial order p) with the mode number m satisfying the equation m=v+2μ+1 have approximately the same propagation constants. Thus, modes with the same mode number may be said to belong to the same mode group. For example, a first mode group may comprise modes with mode number m=3 (e.g. $LP_{01}$), a second mode group may comprise modes with mode number m=4 (e.g. $LP_{11a}$ and $LP_{11b}$), a third mode group may comprise modes with mode number m=2 (e.g. $LP_{02}$, $LP_{21a}$, and the $LP_{21b}$), and so on.

Additionally or alternatively, two modes may be said to belong to the same mode group if a relative difference between their propagation constants is equal to or less than 0.02%. Referring back to FIG. 2, the transmitter 3 comprises a quantum transmitter 9 optically coupled to a (first) optical mode converter 17, and a (first) classical communication device 15 optically coupled to a (second) optical mode converter 11. The transmitter 3 can be implemented in a number of ways, for example as an integrated device (e.g. the quantum transmitter 9, the classical communication device 15, and the optical mode converters 11, 13 may be integrated on a (photonic) integrated circuit) or as a system of discrete components (e.g. the conventional "QKD transmitter" of FIG. 1 may provide the quantum transmitter 9 and the classical communication device 15 which are connected via optical single-mode fibres to the first and second mode converters 11, 13 respectively).

In general, the quantum transmitter 9 is configured to prepare and provide quantum signals (i.e. to encode quantum information into optical pulses). The quantum transmitter 9 may be of any known, suitable design (for example, the quantum transmitter 9 may be (part of) a conventional QKD transmitter device). For example, the quantum transmitter 9 may be configured to perform time-bin encoding (i.e. to provide pairs of optical pulses with a well-defined temporal separation and with a well-controlled phase relationship). In an embodiment, the quantum transmitter 9 may comprise a (pulsed) laser. Additionally, the quantum transmitter 9 may comprise an attenuator and an encoding interferometer suitable for preparing, from the optical pulses emitted by the lasers, a plurality of quantum states suitable to implement quantum cryptography techniques. The quantum transmitter 9 may comprise a random number generator configured to provide random numbers for selecting which one of the quantum states should be prepared next.

The quantum transmitter 9 is configured to provide the quantum signals to the first mode converter 11 via an optical channel 21. The optical channel 21 may be configured to support transmission of only a single spatial mode (at the operating wavelength). For example, the optical channel 21 may be a single-mode fibre. In another example, the optical channel 21 may be an integrated waveguide. In yet another example, the optical channel 21 may be a free-space beam path (in this example, the optical channel 21 may support multiple spatial modes and the quantum transmitter 9 may provide the quantum signals in a single, freely propagating mode).

The first optical mode converter 11 is configured to optically couple the optical channel 21 to the multimode fibre 5. In particular, the first optical mode converter 11 is configured to couple the optical channel 21 to one or more modes of a particular "target" group of modes of the multimode fibre 5. For example, the first optical mode converter 11 may couple the optical channel 21 to modes of the first mode group (i.e. the $LP_{01}$ mode). Alternatively, the first optical mode converter 11 may couple the optical channel 21 to modes of the another mode group, for example the second mode group (i.e. the $LP_{11a}$ and the $LP_{11b}$ mode).

The mode converter 11 may couple the optical channel 21 predominantly to one mode of the target mode group, or to a number of modes of the target mode group. For example, when the target mode group is the second mode group, the mode converter 11 may couple the optical channel 21 to i)

the $LP_{11a}$ mode, ii) the $LP_{11b}$ mode, or iii) a combination of the $LP_{11a}$ and $LP_{11b}$ modes (e.g. a linear superposition). The mode converter 11 may further be configured such that the optical channel 21 is substantially decoupled from modes belonging to other mode groups. In other words, the mode converter 11 couples the optical channel 21 only modes of the target mode group and not (or to an insignificant degree) to the modes of other mode groups. Example implementations of the optical mode converter 11 are described below with reference to FIGS. 6 and 7.

Referring back to FIG. 2, the quantum transmitter 9 sends quantum signals to the mode converter 11 which couples the quantum signals into the multimode fibre 5 such that only modes of one mode group are excited. The quantum signals propagate through the multimode 5 without undergoing significant amplitude or phase distortions. This is because, when propagating through the multimode fibre 5, the quantum signals may propagate only in modes which have (substantially) the same (or sufficiently similar) propagation constant (i.e. in modes which are well phased matched).

For example, the mode converter 11 may be configured to couple the optical channel 21 to the second mode group, and in particular to the $LP_{11a}$ mode, and the multimode fibre 5 may cause coupling between the $LP_{11a}$ and $LP_{11b}$ modes (i.e. the $LP_{11b}$ modes may get excited during the propagation of the quantum signals through the multimode fibre 5 even though the mode converter 11 launched the quantum signals into the $LP_{11a}$ mode). Such a coupling between modes of the same mode group may be difficult to prevent but may nevertheless be acceptable because coupling between modes in the same group does not introduce phase noise. As mentioned above, coupling between modes in different mode groups (which would introduce phase noise) is strongly reduced, thus the multimode fibre 5 may cause only very weak (i.e. insignificantly weak) coupling between the $LP_{11a}$ mode (belonging to the target mode group in this example) and, say, the $LP_{01}$ mode (belonging to a different mode group). This situation can be compared the case where a conventional (single-mode fibre based) QKD transmitter is connected to the multimode fibre. In this case, the conventional QKD transmitter excites a (large) number of modes of the multimode fibre, say (at least) the $LP_{01}$ mode and the $LP_{11a}$ mode. Because the propagation speeds of these modes are significantly different (i.e. these are mode belonging to different mode groups), the quantum signals acquire phase noise and timing errors during propagation through the fibre. Thus, the provision of the mode converter 11 reduces phase noise and timing errors of the quantum signals.

The quantum signals propagate through the multimode fibre 5 and are received by the receiver device 7. The receiver device 7 comprises a quantum receiver 23 optically coupled to a (third) optical mode converter 17, and a (second) classical communication device 25 optically coupled to a (fourth) optical mode converter 19. The receiver device 7 can be implemented in a number of ways, for example as an integrated device (e.g. the quantum receiver 23, the classical communication device 25, and the optical mode converters 17, 19 may be integrated on a (photonic) integrated circuit) or as a system of discrete components (e.g. the conventional "QKD receiver" of FIG. 1 may provide the quantum receiver 23 and the classical communication device 25 which are connected via optical single-mode fibres to the third and fourth mode converters 17, 19 respectively).

In general, the quantum receiver 23 is configured to receive quantum signals and perform a quantum state measurement on the received quantum signals. To this end, the quantum receiver 23 may comprise at least one detector configured to detect quantum signals (e.g. a single photon detector such as a single-photon avalanche diode). The quantum receiver 23 may be of any known, suitable design (for example, the quantum receiver 23 may be (part of) a conventional QKD receiver or transceiver device). In an embodiment, the quantum receiver 23 may be configured to decode time-bin encoded quantum signals. In this embodiment, the quantum receiver 23 may comprise a decoding interferometer (e.g. an asymmetric Mach-Zehnder interferometer) having a long arm and a short arm. A phase modulator may be provided in one of the arms of the decoding interferometer which allows the phase of a photon passing through that arm to be set to one of at least two values. At least one output of the decoding interferometer may be connected a detector.

The quantum receiver 23 is configured to receive quantum signals from the third mode converter 17 via an optical channel 27. Similar to the optical channel 21 connecting the quantum transmitter 9 and the first mode converter 11, the optical channel 27 may be configured to support transmission of only a single spatial mode (at the operating wavelength). For example, the optical channel 27 may be a single-mode fibre. In another example, the optical channel 27 may be an integrated waveguide. In yet another example, the optical channel 27 may be a free-space beam path (in this example, the optical channel 27 may support multiple spatial modes and the quantum receiver 23 may be configured to receive only quantum signals in a single, freely propagating mode).

The third optical mode converter 17 is configured to optically couple the multimode fibre 5 to the optical channel 27. In particular, the third optical mode converter 17 is configured to couple one or more modes of the target mode group of the first mode converter 11 (i.e. the mode converter connected to the quantum transmitter 9) to the optical channel 27. Thus, similar to the first mode converter 11, the third mode converter 17 may be configured to couple the optical channel 27 only to mode(s) of the target mode group (and not to modes of other mode groups). For example, when the first optical mode converter 11 is configured to couple the optical channel 21 to modes of the first mode group (i.e. the $LP_{01}$ mode), the third optical mode converter 17 may also be configured to couple the optical channel 27 to modes of the first mode group. Thus, in some embodiments, the first and third mode converters 11, 17 may be configured in the same way (e.g. the first and third mode converters 11, 17 may be identical devices).

In other embodiments, the first and third mode converters 11, 17 may be configured to couple the respective channels 21, 27 to different modes of the same mode group. For example, the first optical mode converter 11 may be configured to couple the optical channel 21 to the $LP_{11a}$ mode (i.e. in this example the target mode group is the second mode group), and the third mode converters 17 may be configured to couple the optical channel 27 to the $LP_{11b}$ mode (i.e. to a different mode of the target mode group of the first mode converter 11). In this example, the quantum signals (provided by the quantum transmitter 9 and launched into the multimode fibre 5 through the first mode converter) are received (without phase noise) even though the receiving mode converter 17 couples to a different mode than the transmitting mode converter 11. This is because both mode converters 11, 17 couple to modes of the same mode group, and the (long) multimode fibre 5 provides coupling between modes of the same group. Thus, typically all of the modes of the target mode group are approximately equally populated at the receiver end of the multimode fibre 5. In the above example, the $LP_{11a}$ mode and the $LP_{11b}$ mode may be equally populated when the quantum signals reach the receiver. Thus, the quantum receiver 23 receives a significant amount of signal (in this case approximately 50%) even though the transmitting and the receiving mode converter 11, 17 couple to different modes.

In general, the provision of the mode converter 17 at the receiver end of the multimode fibre 5 may reduce the noise level of the signals received by the quantum receiver 23. This is because the mode converter 17 can act as a mode-filter, i.e. the mode converter 17 can effectively filter out light from modes that would otherwise contribute to phase noise. In particular, the mode converter 17 can effectively filter out light in modes that do not belong to the target mode group and that may have been excited, for example, through the (weak) coupling provided by the multimode mode fibre 5, so that this light does not couple into the quantum receiver 23.

For example, the first mode converter 11 may be configured to couple the quantum signals into the $LP_{01}$ mode (i.e. the first mode group), and the multimode fibre 5 may provide some (weak) coupling to the $LP_{11a}$ mode (e.g. induced by local mechanical stress or the like). If the quantum receiver 23 is directly attached to the multimode fibre 5, the quantum receiver may receive and detect the portion of the quantum signal that travelled in the $LP_{01}$ mode as well as the portion that travelled in the $LP_{11a}$ mode (and thus acquired a different phase than the portion in the $LP_{01}$ mode), resulting in an enhanced noise level (or error rate). In contrast, the provision of the mode converter 17 ensures that only light in the modes of the target mode group are provided to the quantum receiver. Thus, in this example, the mode converter 17 filters out the spurious light in the $LP_{11a}$ mode and prevents this light from reaching the quantum receiver 23.

In broad terms, the provision of the mode converters 11, 17 enables the transmission of quantum signals over the multimode fibre 5 in a way that resembles transmission over a single-mode fibre, in that the signal propagates in limited number of well-defined (and well phase-matched) modes, and in that undesirable coupling to other guided modes is (sufficiently) low.

As mentioned above, quantum communication systems often require a classical data channel in addition to the quantum channel. In the quantum communication system 1 of FIG. 2, a classical channel is implemented by a (second) multimode fibre 29 which allows the classical communication device 15 of the transmitter 3 to exchange (i.e. transmit and receive) data signals with the classical communication device 25 of the receiver 7. The second multimode fibre 29 may be of a similar type as the first multimode fibre 5 or may be of a different type. To reduce signal distortions caused by the multimode fibre 29, both classical communication devices 15, 25 are optically coupled to respective mode converters 13, 19 which enables classical communication by transmission through only one mode group of the multimode fibre 29 (in a similar manner as described above for the transmission of the quantum signals).

In particular, the classical communication device 15 is optically coupled the (second) mode converter 13 via an optical channel 31. Similar to the optical channel 21 coupling the quantum transmitter 9 and first mode converter 11, the optical channel 31 may be a single-mode fibre, an integrated waveguide or a free-space beam path. The second optical mode converter 13 is configured to optically couple the optical channel 31 to the second multimode fibre 29. In particular, the second optical mode converter 13 is configured to couple the optical channel 31 to one or more modes of a target group of modes of the multimode fibre 29 (in the same way as described above with reference to the first mode converter 11).

In an embodiment, the classical signals provided by the classical communication device 15 are transmitted through the multimode fibre 29 without significant signal distortions because the second optical mode converter 13 excites only modes from one mode group, and the coupling between modes of different mode groups is (sufficiently) weak.

The classical signals transmitted over the second multimode fibre 29 transmitted to the receiver device 7, where they are received by the (fourth) optical mode converter 19. The fourth optical mode converter 19 is configured to optically couple the second multimode fibre 29 to an optical channel 33 connected to the second classical communication device 25. In particular, the fourth optical mode converter 19 is configured to couple one or more modes of the target mode group of the second mode converter 13 (i.e. the mode converter connected to the first classical communications device 15) to the optical channel 33. Thus, similar to the second mode converter 13, the fourth mode converter 19 may be configured to couple the optical channel 33 only to mode(s) of the target mode group (and not to modes of other mode groups).

Figure 2:
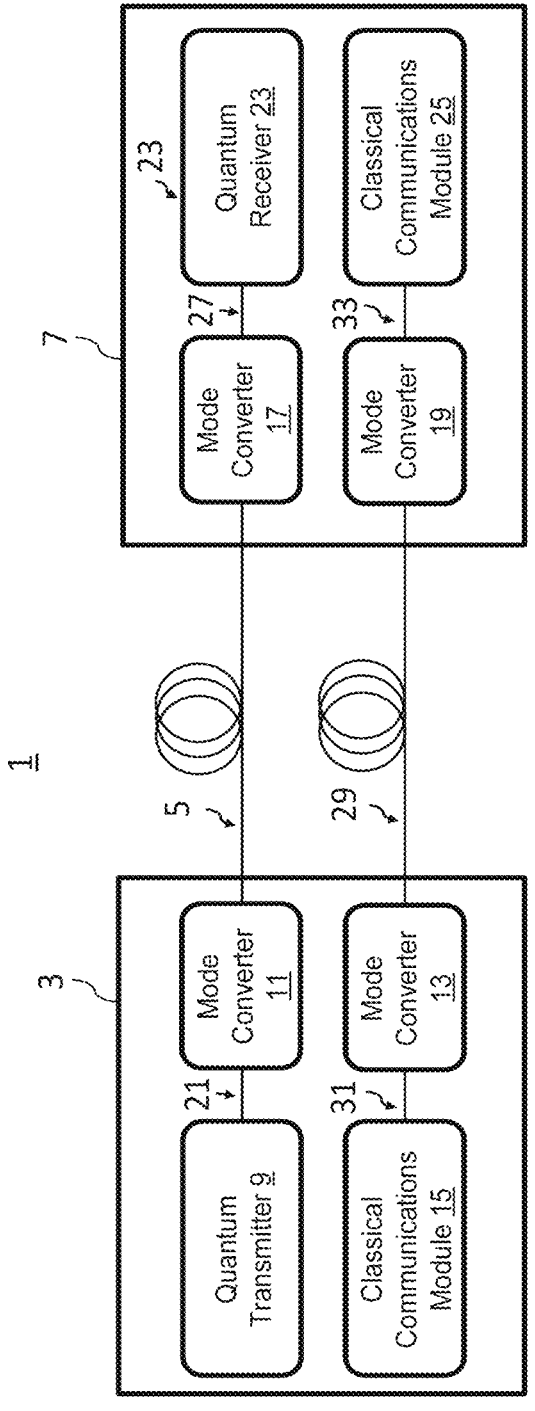
FIG. 2 is a schematic of a quantum communication system in accordance with an embodiment.

It is understood that because in the quantum communication system 1 of FIG. 2, the quantum channel and the classical channel are implemented in two independent multimode fibres, the target mode groups for transmitting the quantum and classical signals can be selected independently.

Figure 5:
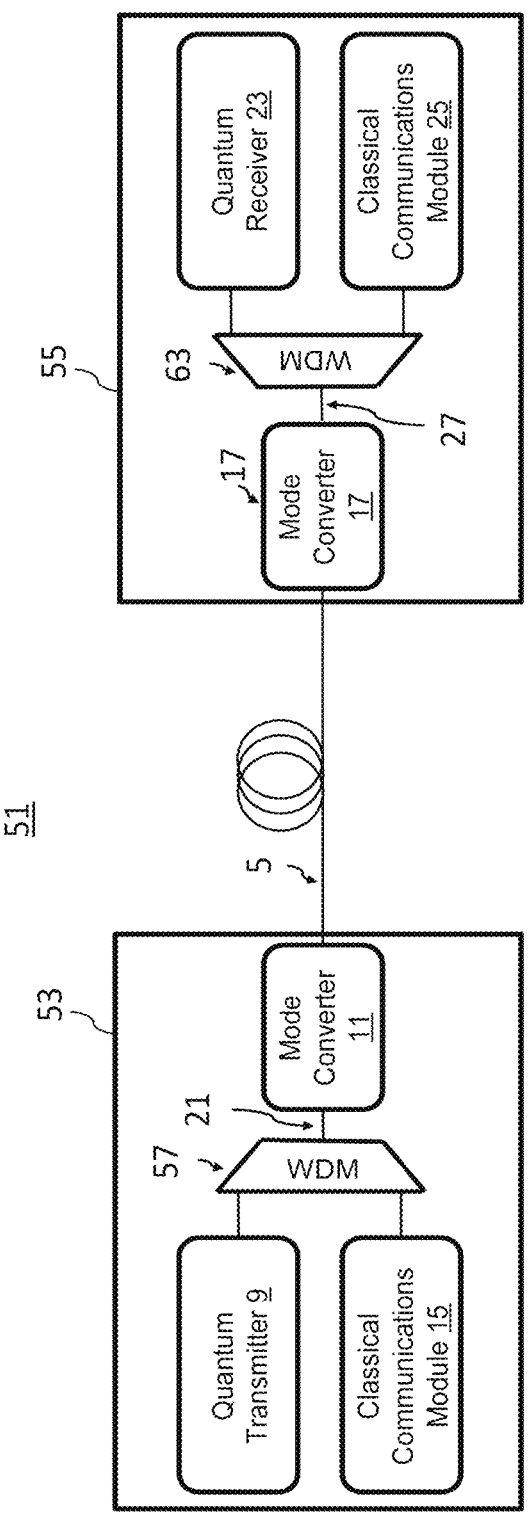
FIG. 5 is a schematic of a variation on the quantum communication system of FIG. 1.

It is often desirable to reduce the number of optical fibres necessary to implement a QKD protocol. One way of achieving this is by using wavelength division multiplexing (WDM), i.e. using the same optical fibre to implement the quantum and the classical channel. FIG. 5 shows a corresponding variation on the quantum communication system of FIG. 2. Like the embodiment of FIG. 2, the quantum communication system 51 of FIG. 5 is suitable for implementing QKD protocols over multimode fibres. In particular, the quantum communication system 51 of FIG. 5 uses WDM to implement the quantum and the classical channel between the transmitter 53 and the receiver 55 in the same multimode fibre 5. The transmitter 53 comprises the quantum transmitter 9 and the classical communication device 15, as described above with reference to FIG. 2. In the embodiment of FIG. 5, the quantum transmitter 9 and the classical communication device 15 are further configured to operate at (slightly) different wavelengths (to enable WDM).

The quantum transmitter 9 and the classical communication device 15 are optically coupled (e.g. via single-mode fibres, integrated waveguides or free-space beam paths) to a wavelength division multiplexer 57. The wavelength division multiplexer 57 configured to combine the received signals into an optical channel 21 connected to the optical mode converter 11. Any known, suitable wavelength division multiplexer may be adapted for use in the transmitter 9. In an embodiment, the quantum transmitter 9, the classical communication device 15, and the wavelength division multiplexer 57 may be part of a conventional WDM-QKD transmitter. In any case, the wavelength division multiplexer 57 is typically a bidirectional device, i.e. the wavelength division multiplexer 57 may perform multiplexing when light is transmitted from the quantum transmitter 9 or the classical communication device 15, and may perform multiplexing when light is received from the optical channel 21.

As described with reference to FIG. 2, the optical mode converter 11 is configured to optically couple the optical channel 21 (carrying the multiplexed signals) to one or more modes of a target group of (degenerate) modes of the multimode fibre 5. In particular, the optical mode converter 11 is configured to couple the quantum signals and classical signals to the same mode group. For example, the optical mode converter 11 may couple both the quantum and the classical signals (received from the optical channel 21) to modes of the mode group (i.e. the $LP_{01}$ mode). As described above, the quantum and classical signals can propagate through the multimode fibre 5 without significant signal or phase noise.

The receiver 55 comprises the mode converter 17 optically coupled a wavelength division demultiplexer 63, the quantum receiver 23 and the classical communication device 25. As described with reference to FIG. 2, the optical mode converter 17 is configured to couple one or more modes of the target mode group of the mode converter 11 of the transmitter device 53 to the optical channel 27. In particular, the mode converter 27 is configured to couple the quantum signals and classical signals propagating in the target mode group to the optical channel 27. The wavelength division demultiplexer 63 is configured to receive the multiplexed signals from the optical channel 27 and spatially separate the signals according to their wavelength. In particular, the wavelength division demultiplexer 63 is configured to couple the quantum signals to the quantum receiver 23 and the classical signals to the classical communication device 25. The wavelength division demultiplexer 63 may be implemented in the same way as the wavelength division multiplexer 57 described above.

In general, the optical mode converters 11, 13, 17, 33 (described above with reference to FIGS. 2 and 5) may be implemented using a number of known techniques, which are collectively also referred to as "optical beam shaping" techniques. Optical beam shaping techniques usually include a way of redistributing energy within an optical beam so as to adjust the intensity and/or phase profile. Typically, the optical mode converters 11, 13, 17, 33 are configured to gradually change the transverse profile of the received light to match the transverse profile of the respective target mode. "Gradually changing" may mean that the transverse profile of light propagating through the optical mode converter has a different transverse extent at three or more equidistantly spaced positions along an optical path of the optical converter. For example, the optical mode converter 11 may receive light having a transverse profile with a small transverse extent from the (single-mode) optical channel 21, and may be configured so that the transverse extent of the light increases as the light propagates through the mode converter 11 until the transverse profile matches the fundamental mode of multimode fibre.

Figures 6, 7:
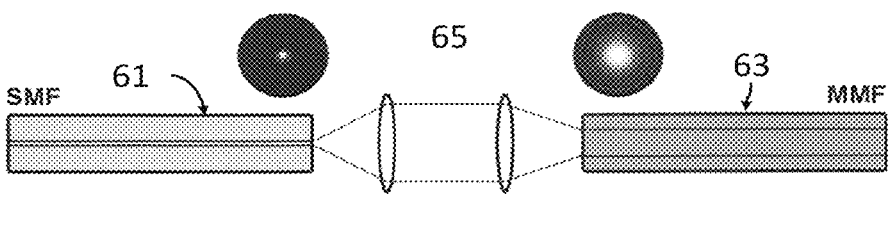
FIG. 6 is a schematic of an example implementation of an optical mode converter in accordance with an embodiment.
FIG. 7 is a schematic of an optical mode converter and multiplexer in accordance with an embodiment.

For example, the optical mode converter may comprise a free-space optical system based on refractive or diffractive optical elements. Typically, the mode converter is implemented as a bidirectional optical component. FIG. 6 shows such a possible implementation of the optical mode converter of FIGS. 2 and 5, which maps the mode of the single-mode fibre 61 onto the $LP_{01}$ mode of the multimode fibre 63 using a beam shaping system 65 based on appropriately selected lenses. In particular, the lenses are selected such that the optical mode converter couples the single mode fibre 61 to modes of the target mode group (in this example the first mode group) without providing (substantial) coupling to modes of other modes groups. It is understood that the embodiment of FIG. 6 is only an example. In another embodiment, the optical mode converter may be implemented using fibre-integrated micro-optics. In another embodiment, the optical mode converter may be implemented using (appropriately designed) tapered waveguides, for example to adiabatically adjust the waveguide geometry (or refractive index) so as to convert the guided mode profile in a substantially lossless way.

As mentioned above, the mode converter is typically configured to couple propagating light from the (single-mode) optical channel to a selected mode (or multiple modes of the same mode group) of the multimode fibre without significant excitation of other modes of the multimode fibre. More specifically, the mode converter may be configured to couple the optical channel to one or more modes of the target mode group with a selectivity which is greater than 5 dB, i.e. a power coupling to the target mode group may be at least 5 dB higher than the total power coupling into modes of other mode groups. In embodiments, the selectivity of the mode converter may be greater than 10 dB or 20 dB.

Referring to FIG. 7, an embodiment of an optical mode converter and multiplexer 71 (hereafter mode converter 71 for short) is described. The mode converter 71 of FIG. 7 is particularly suitable for "mode group division multiplexing" as described in detail below with reference to FIG. 8 to 10. In broad terms, the mode converter 71 couples each of N optical channels $73_1$-$73_N$ (bidirectionally) to (one or more) modes of N different mode groups of a multimode fibre 75 (where N in an integer number larger than zero). Because the mode converter 71 is typically bidirectional, the mode converter 71 can act as a multiplexer as well as a demultiplexer.

In other words, each of the N optical channels $73_1$-$73_N$ is (bidirectionally) coupled to a different target mode group. In particular, the optical mode converter 71 may couple each of the N optical channels $73_1$-$73_N$ to the respective target mode group without providing (substantial) coupling to modes of other modes groups. FIG. 7 shows four optical channels $73_1$-$73_4$, and the optical mode converter 71 is configured to couple the optical channels $73_1$-$73_4$ respectively to the first to fourth mode group of the multimode fibre 75. In other embodiments the optical mode converter 71 may couple a different number of optical channels to respective target mode groups of the multimode fibre 75. It is understood that the mode converter 71 can be adapted to implement the mode converters described above with reference to FIGS. 2 and 5. Further the optical mode converter 71 may comprise a known optical beam shaping system, as described above with reference to FIG. 6. In an embodiment, the mode converter 71 may comprise single-mode waveguides (respectively coupled to the optical channels $73_1$-$73_N$) that are placed in close proximity to the multimode fibre such that light couples from the single-mode waveguides into the multimode fibre in the desired way (i.e. such that each optical channel is coupled to a mode of a different mode group without exciting modes of other mode groups). To this end, mode converter 71 may comprise an appropriately designed photonic lantern type structure.

Figure 8:
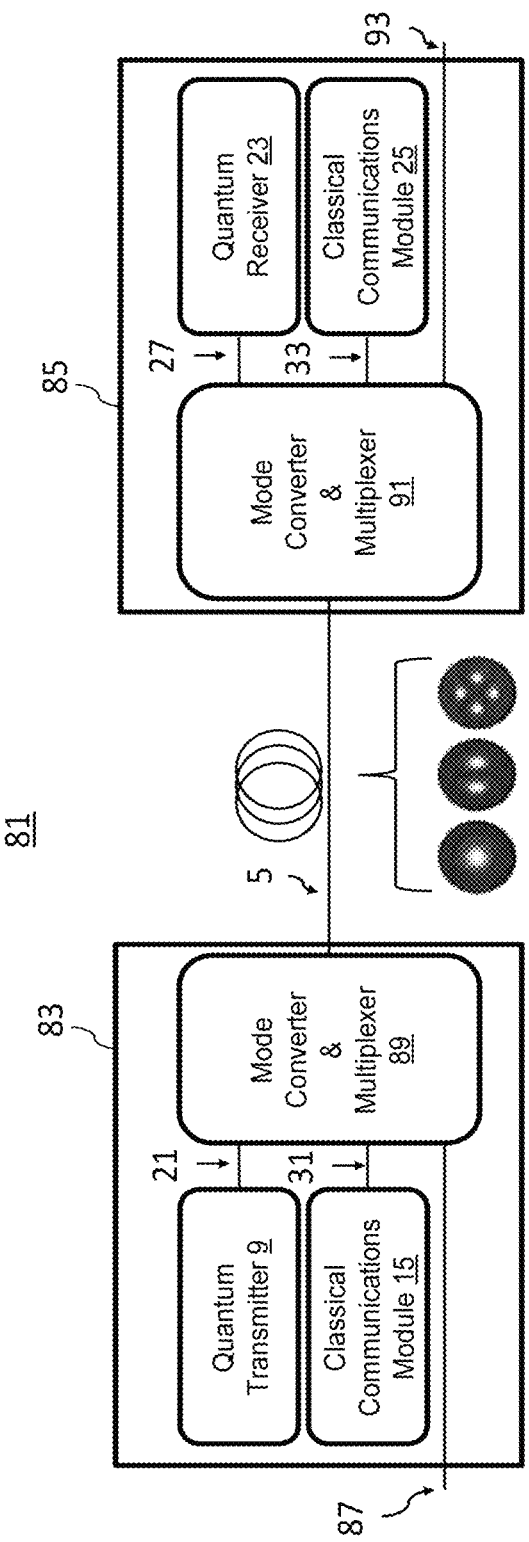
FIGS. 8, 9 and 10 are schematics of further quantum communication systems in accordance with embodiments.

FIG. 8 shows a variation on the quantum communication system of FIG. 2. Like the embodiment of FIG. 2, the quantum communication system 81 of FIG. 8 is suitable for implementing QKD protocols over multimode fibres. In particular, the quantum communication system 81 of FIG. 8 uses "mode group division multiplexing" to multiplex the quantum channel and two different classical channels (all operating at the same wavelength) for transmission through a multimode fibre.

The quantum communication system 81 comprises a transmitter device 83 optically connected to a receiver device 85 via the multimode fibre 5. The transmitter 83 comprises the quantum transmitter 9 and the classical communication device 15, as described above with reference to FIG. 2. In the embodiment of FIG. 8, the quantum transmitter 9 and the classical communication device 15 are configured to operate at substantially the same wavelengths.

The transmitter device 83 further comprises an optical mode converter and multiplexer 89 (mode converter 89 for short) optically coupled to the quantum transmitter 9 (via optical channel 21), the classical communication device 15 (via the optical channels 31), and to an external data channel 87 (for example a conventional telecom fibre carrying classical signals unrelated to the QKD protocol implemented by the system 81). The optical channels 21 and 31 may be implemented as single-mode fibres, integrated waveguides or free-space beam paths. The external data channel 87 may typically be a single mode fibre.

The mode converter 89 is configured to optically couple each optical channel 21, 31, 87 to (one or more) modes of different mode groups. The mode converter 71 (described above with reference to FIG. 7 when N 3) may be used to implement the mode converter 89 of FIG. 8. In the embodiment of FIG. 8, the mode converter 89 may be configured to couple the quantum emitter 9, the classical communication device 15, and the external data channel 87 respectively to modes of the first, second and third mode group of the multimode fibre 5. The mode-group-multiplexed signals propagate through the fibre 5 without acquiring substantial signal or phase distortions since each signal propagates only within its respective target mode group and is only (if at all) weakly coupled to modes of other mode groups.

The receiver device 85 comprises the quantum receiver 23 and the classical communication device 25 as described above with reference to FIG. 2. The receiver 85 further comprises an optical mode converter and multiplexer 91 (mode converter 91 for short) for demultiplexing the signals received from the multimode fibre 5 and guiding the demultiplexed signals to the corresponding receivers. The mode converter 91 is coupled to the quantum receiver 23 (via optical channel 27), the classical communication device 25 (via optical channel 33) and a further external data channel 93. The optical channels 27 and 33 may be implemented as single-mode fibres, integrated waveguides or free-space beam paths. Like the data channel 87, the external data channel 93 may typically be a single-mode fibre.

The mode converter 91 is configured to perform mode group division demultiplexing on the signals received from the multimode fibre 5, i.e. each channel 27, 33, 91 is optically coupled to one or more modes of a target mode group of the mode converter 89 of the transmitter device 83. In the embodiment of FIG. 8, the mode converter 91 may be configured to couple the quantum receiver 23, the classical communication device 25, and the external data channel 91 respectively to modes of the first, second and third mode group of the multimode fibre 5.

Thus, the quantum communication system 81 of FIG. 8 uses less spectral bandwidth than a conventional QKD using WDM (since the quantum and the two data channels are operating the same wavelengths). This can free up more bandwidth for other applications on the fibre network.

In an embodiment, the above described quantum communication system 81 can also improve the QKD performance beyond that of convention single-mode fibre based WDM-QKD systems. This is because by employing mode group division multiplexing, the noise in the quantum channel caused by Raman scattering of the classical light can be reduced. In conventional single-mode fibre based systems, Raman scattering of classical signals when multiplexed with quantum signals is a fundamental source of noise that cannot be filtered out. Specifically, spontaneous Raman emission from the fibre core (e.g. silica) when "pumped" by the classical light field, can result in emission coupled into the same single mode. In contrast, in the quantum communication system 81, Raman scattering of the classical field into the mode group implementing the quantum channel is reduced because the classical field and the quantum signals propagate in different modes which have little overlap. Therefore, using mode group division multiplexing for quantum and classical channels, makes it possible to lower the impact of spontaneous Raman scattering compared to WDM.

Whilst the embodiment of FIG. 8 employed mode group division multiplexing of one quantum and two classical channels, other embodiments may multiplex more or fewer channels (an example embodiment where four channels are multiplexed in described below with reference to FIG. 9). Further, it is understood that the embodiments of FIGS. 5 and 8 may be combined which may lead to a lower noise level compared to conventional WDM-QKD systems. In other words, the above described mode group division multiplexing technique and WDM may be combined, for example such that each implemented channel propagates in a different mode group and is implemented at a different wavelength.

Figure 9:
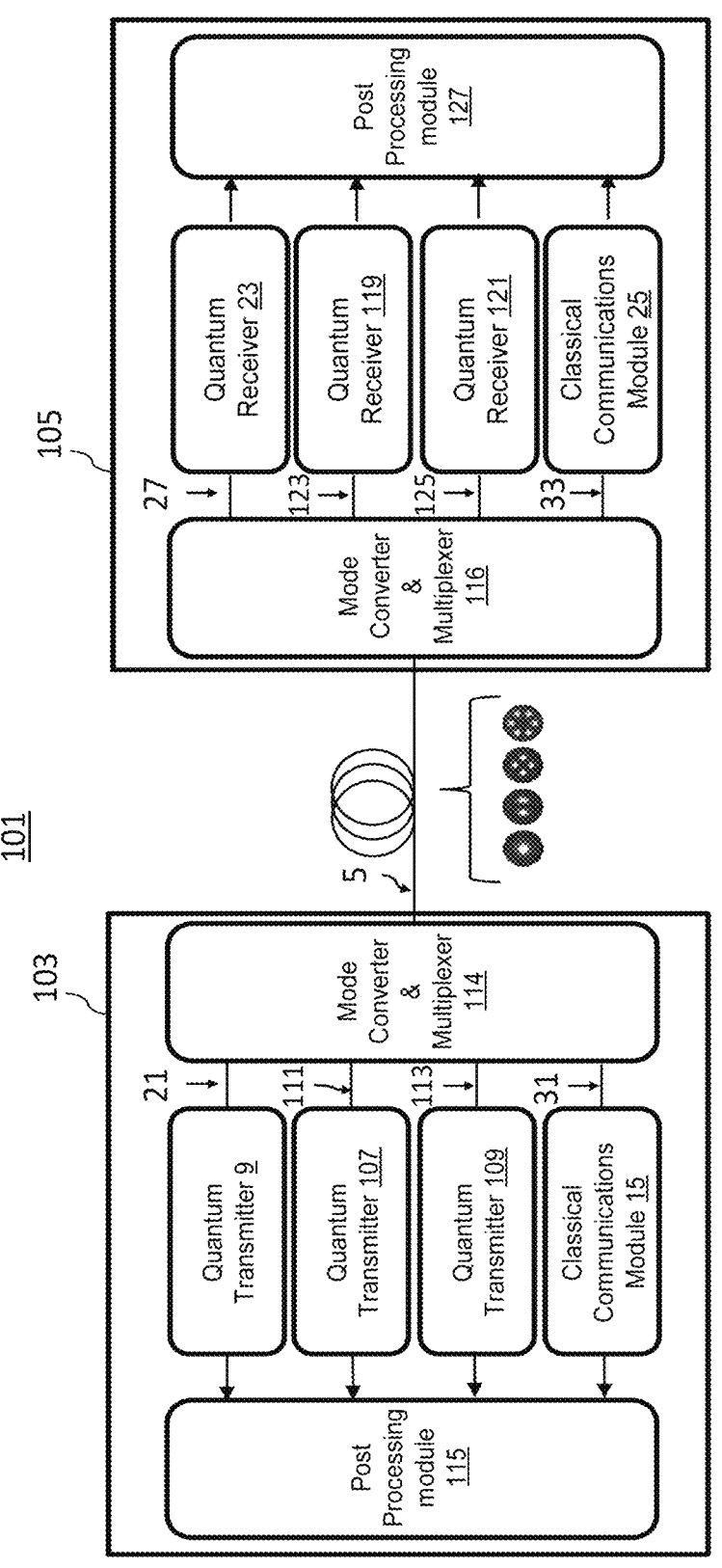

FIG. 9 shows a variation on the quantum communication system of FIG. 2. Like the embodiment of FIG. 2, the quantum communication system 101 of FIG. 9 is suitable for implementing QKD protocols over multimode fibres. In particular, the quantum communication system 101 of FIG. 9 uses mode group division multiplexing to multiplex multiple quantum channels and one classical channel (all operating at the same wavelength) for transmission through a multimode fibre. By using mode group division multiplexing of multiple quantum channels the key rate of the QKD system can be increased (without the need to implement multiple instance of the entire QKD system).

The quantum communication system 101 comprises a transmitter device 103 optically connected to a receiver device 105 via the multimode fibre 5. The transmitter 103 comprises the three quantum transmitters 9, 107, 109 and the classical communication device 15. The quantum transmitters 107, 109 may be different instances of the quantum transmitter 9 as described above with reference to FIG. 2, and may be configured to operate independently of each other (thus each quantum transmitter may generate quantum signals independent of the quantum states generated by the other quantum transmitter). In the embodiment of FIG. 9, the quantum transmitters 9, 107, 109 and the classical communication device 15 are configured to operate at substantially the same wavelengths. The transmitter device 103 further comprises a post-processing module 115 configured to distil a secure key by processing data specifying the quantum states prepared by the quantum transmitters 9, 107, 109 and data specifying measurement results obtained by the receiver device 105 (this data is received by the classical communication device 15).

The transmitter device 103 further comprises an optical mode converter and multiplexer 114 (mode converter 114 for short) coupled by the optical channels 21, 111, 113, 31 to the quantum transmitters 9, 107, 109 and the classical communication device 15. The optical channels 21, 111, 113, 31 may be implemented as single-mode fibres, integrated waveguides or free-space beam paths.

The mode converter 114 is configured to optically couple each optical channel 21, 111, 113, 31 to (one or more) modes of different mode groups. The mode converter 71 (described above with reference to FIG. 7 when N 4) may be used to implement the mode converter 114 of FIG. 9. In the embodiment of FIG. 9, the mode converter 114 may be configured to couple the quantum emitters 9, 107, 109 and the classical communication device 15 respectively to modes of the first, second, third and fourth mode group of the multimode fibre 5. The mode-group-multiplexed signals propagate through the fibre 5 without acquiring substantial signal or phase distortions since each signal propagates only within its respective target mode group and is only (if at all) weakly coupled to modes of other mode groups.

The receiver device 105 comprises three quantum receivers 23, 119, 121 and the classical communication device 25. The quantum receivers 119, 121 may be different instances of the quantum receiver 23 described above with reference to FIG. 2. The receiver device 105 further comprises an optical mode converter and multiplexer 116 (mode converter 116 for short) for demultiplexing the signals received from the multimode fibre 5 and guiding the demultiplexed signals to the corresponding receivers. In particular, the mode converter 116 is coupled to the quantum receivers 23, 119, 121 and to the classical communication device 25 via the optical channels 27, 123, 125, 33. The optical channels 27, 123, 125, 33 may be implemented as single-mode fibres, integrated waveguides or free-space beam paths.

The mode converter 116 is configured to perform mode group division demultiplexing on the signals received from the multimode fibre 5, i.e. each channel 27, 123, 125, 33 is optically coupled to one or more modes of a target mode group of the mode converter 114 of the transmitter device 103. In the embodiment of FIG. 8, the mode converter 91 may be configured to couple the quantum receivers 23, 119, 121 and the classical communication device 25 respectively to modes of the first, second, third and fourth mode group of the multimode fibre 5.

The receiver device 105 further comprises a post-processing module 127 configured to distil the secure key by processing data specifying measurement results obtained by the quantum receivers 23, 119, 121 and data specifying the bases in which the quantum states were prepared by the quantum transmitters 9, 107, 109 (this data is transmitted over the classical channel, i.e. transmitted by the classical communication device 15 and received by the classical communication device 25).

Thus, by using the same classical channel for three (independent) quantum channels, the quantum communication system 101 can achieve a threefold increase in the secure key rate with a simple setup (i.e. much simpler than operating three independent conventional systems in parallel). Advantageously, mode group multiplexing enables the implementation of multiple quantum channels over a single optical fibre without relying on WDM (thus saving spectral bandwidth). Further, the efficiency and performance of QKD post-processing typically depends on sample size. In an embodiment, the processing is performed in fixed-size blocks. In this case, by using three quantum channels to collect data for a single post-processing transaction, the block of data may be collected faster than a convention system comprising three separate complete QKD systems where each QKD system collects and processes their own block of data. Thus, the quantum communication system 101 of FIG. 9 (by employing multiple multiplexed quantum channels) enables faster processing of data so as to generate keys at more regular intervals.

Mode group division multiplexing may be particularly advantageous for implementing measurement-device-independent (MDI) QKD protocols such as "twin field quantum key distribution" (TF-QKD). In general, MDI QKD protocol often consider a network comprising 3 nodes, i.e. two transmitters (Alice and Bob) which are each optically connected to a central node ("Charlie"). Charlie may be untrusted. MDI QKD system often have different (or additional) technical requirements than two-nodes QKD protocols (such as the BB84 protocol). Specifically, MDI QKD protocols typically require additional stabilisation signals to be shared between Alice and/or Bob and/or Charlie, which, as described below, can be efficiently be implemented using mode group division multiplexing.

For example, MDI QKD may require Alice and Bob to emit indistinguishable photons, which means that their lasers need to emit at the same wavelength. Since the emission spectra of lasers can drift with time due to thermal changes, a reference signal between Alice and Bob is often needed. This can include Alice and Bob sharing some continuous-wave laser light for use as a wavelength reference (e.g. provided by the central node). This requires an additional stabilisation subsystem and a "servo channel" connected to Alice and Bob. In an embodiment, this servo channel may be mode group division multiplexed into a higher order mode group of a multimode fibre (similar to the systems described above with reference to FIGS. 8 and 9), thereby avoiding the need for a separate servo fibre.

TF-QKD is a specific MDI QKD protocol. In general, in TF-QKD, both Alice and Bob send signals to the receiver Charlie who performs first order optical interference between the signals from Alice and Bob. By disclosing the results of the interference, it is possible for Alice and Bob to establish a secret key. TF-QKD has specific servo channel requirements, for example TF-QKD may require wavelength dissemination and a phase reference between Alice and Bob since the protocol relies on first-order interference measurements. Conventionally, signals for TF-QKD stabilisation feedback are often sent by wavelength division multiplexing the phase reference with the quantum channel, thereby using additional spectral bandwidth for the phase reference (and thus blocking this bandwidth for other applications).

Figure 10:
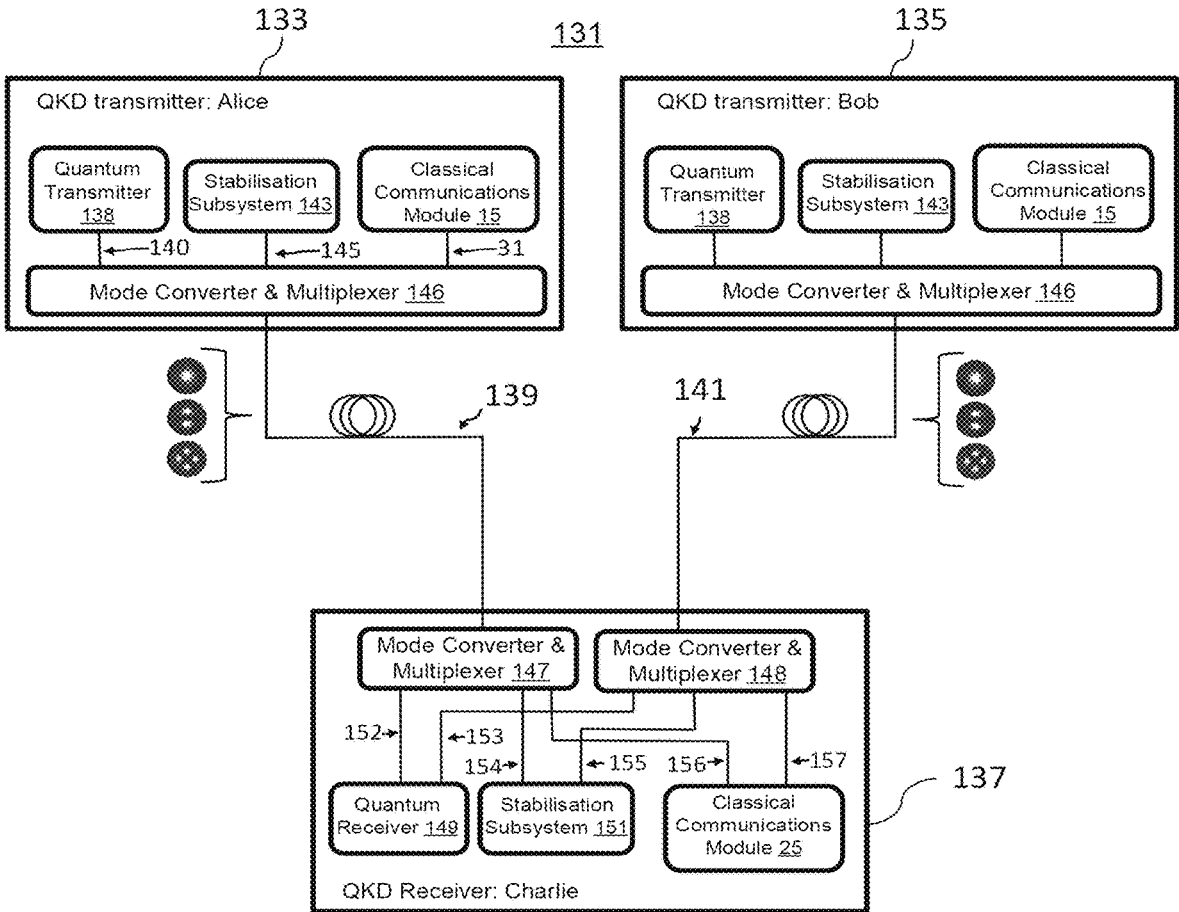

A specific example of mode group division multiplexing applied to a TF-QKD system will now be described with reference to FIG. 10. In overview, FIG. 10 shows a quantum communication system 131 suitable for implementing a TF-QKD scheme where Alice and Bob each encodes information in the phase of an optical pulse which is then transmitted over a multimode fibre to Charlie who sends phase reference light to both Alice and Bob via the respective multimode fibres. This is achieved by applying mode group division multiplexing to multiplex the encoded quantum signals and the phase reference light into dedicated (higher order) mode groups of the multimode fibre. Because the quantum signals and the phase reference light propagate in the same fibre, the phase shifts experienced due to e.g. fibre bends, thermal contractions and the like will be correlated. Thus, phase measurements of the phase reference light can be used to correct phase shifts in the quantum channel.

Compared to the conventional approach of implementing TF-QKD, the embodiment of FIG. 10 reduces the bandwidth usage and/or the need for a dedicated servo fibre. In the embodiment of FIG. 10, the classical service channels are also mode group division multiplexed into the multimode fibres carrying the quantum signals and the phase reference light. In other embodiments, the classical service channels may be implemented in separate fibres.

Turning to a detailed description of the embodiment of FIG. 10. A first transmitter device 133 (Alice) is connected to a central receiver device 137 (Charlie) over a multimode fibre 139. A second transmitter device 135 (Bob) is connected to the central receiver device 137 over a multimode fibre 141. The multimode fibres 139, 141 are similar to the multimode fibre 5 described above with reference to FIG. 2. Alice and Bob may be symmetric users of the quantum communication system 131, i.e. the transmitters 133, 137 may be identical. In particular, the transmitters 133, 137 may be configured to apply mode group division multiplexing to implement one quantum channel and two classical channels in the connected multimode fibre 139, 141.

The transmitter device 133 comprises a quantum transmitter 138 configured to provide phase encoded quantum signals to an optical mode converter and multiplexer 146 (mode converter 146 for short) via an optical channel 140. The quantum transmitter 138 may comprise a laser configured to emit coherent light and an encoder unit for preparing phase encoded quantum states from the coherent light emitted by the laser. The encoder unit may comprise a phase modulator and an intensity modulator. In an embodiment, the quantum transmitter 138 may be further configured to encode a random "basis", either Z or X, by selecting a phase value $\alpha_A=0$ or $\alpha_A=\pi/2$, respectively, and a random "bit", either 0 or 1, by selecting a phase value $\beta_A=0$ or $\beta_A=\pi$, respectively. In this case, the optical pulse provided by the quantum transmitter 138 will then carry a total electromagnetic phase $\alpha_A+\beta_A$. The phase of the optical pulse may be relative to the optical phase of a phase reference light received from Charlie 137 as described below.

The transmitter device 133 further comprises the classical communication device 15 (as described above) and a stabilisation subsystem 143 optically coupled to the mode converter 89 via the optical channels 31, 145. The stabilisation subsystem 143 may be configured to stabilise the optical phase and/or the wavelength of the laser of the quantum transmitter 138 so as to ensure that quantum signals prepared by Alice and quantum signals prepared by Bob have a well-controlled phase relationship. In particular, the stabilisation subsystem 143 may be configured to adjust the optical phase and/or the wavelength of the laser of the quantum transmitter 138 based phase reference light received from Charlie 137, e.g. the stabilisation subsystem 143 may be configured to phase-lock the laser of the quantum transmitter 138 to the received phase reference light.

The optical mode converter and multiplexer 146 (mode converter 146 for short) is configured to optically couple each of the optical channels 140, 145, 31 to (one or more) modes of different mode groups of the multimode fibre 139. The mode converter 71 (described above with reference to FIG. 7 when N≥3) may be used to implement the mode converter 146 of FIG. 10. In the embodiment of FIG. 10, the mode converter 146 may be configured to couple the quantum emitter 138, stabilisation subsystem 143, and the classical communication device 15 respectively to modes of the first, second and third mode group of the multimode fibre 139.

As mentioned above, the second transmitter device 135 (Bob) is connected to multimode fibre 141 and comprises the same components as the first transmitter 135, i.e. second transmitter device 135 comprises a corresponding instance of the quantum transmitter 138, stabilisation subsystem 143, the classical communication device 15 and the mode converter 146.

The central receiver device 137 (Charlie) comprises two optical mode converter and multiplexers 147, 148 (mode converters 147, 148 for short), a quantum receiver 149, a stabilisation subsystem 151, and a classical communication device 25. The quantum receiver 149 is connected to both mode converters 147, 148 via respective optical channels 152, 153. The stabilisation subsystem 151 is connected to both mode converters 147, 148 via respective optical channels 154, 155. The classical communication device 25 is connected to both mode converters 147, 148 via respective optical channels 156, 157. The optical channels 140, 145, 31, 152-157 may be implemented as single-mode fibres, integrated waveguides or free-space beam paths.

The mode converter 147 is configured to optically couple each of the connected channels 152, 154, 156 to one or more modes of a target mode group of Alice's mode converter 146. In particular, the mode converter 147 may be configured to couple the channels 152, 154, 156 respectively to modes of the first, second, and third mode group of the multimode fibre 139. The mode converter 148 is configured to optically couple each of the connected channels 153, 155, 157 to one or more modes of a target mode group of Bob's mode converter 146. In particular, the mode converter 148 may be configured to couple the channels 153, 155, 157 respectively to modes of the first, second, and third mode group of the multimode fibre 141.

The quantum receiver 149 is configured to perform first order optical interference between the encoded quantum signals from Alice and Bob. To this end, the quantum receiver 149 may comprise a beam splitter at which the received signals from Alice and Bob can interfere and at least one detector for detecting an outcome of the interference. The output of the detector may be output by Charlie (via the classical communication module 25) to Alice and Bob (i.e. to Alice's and Bob's classical communication devices 15) so that Alice and Bob can each distil a secret key.

Charlie's stabilisation subsystem 151 is configured to provide the phase reference light to Alice and Bob such that Alice and Bob can adjust the wavelength and phase (e.g. by performing a phase-locking technique) of the laser of their respective quantum emitters. This means that the encoded quantum signals provided by Alice and Bob have a well-controlled phase relation.

Using mode group division multiplexing enables the sending the phase reference light and the quantum signals over the same fibre even though the phase reference signal is typically a bright signal compared to the encoded quantum signals (the phase reference signal may be several orders of magnitude larger than the encoded quantum signals which may have less than 1 photon on average). Because the phase reference light and the quantum signals propagate in different mode groups and the coupling between modes of different mode groups is low, noise in the quantum channel caused by the reference light is strongly suppressed.

Thus, the quantum communication system 131 can implement a TF-QKD scheme where the quantum channel, the QKD service channel, and the stabilisation channel are all implemented in the same optical fibre. This means that the quantum communication system 131 can implement a TF-QKD scheme with fewer fibres than conventional systems and/or without relying on WDM.

In an embodiment, WDM may be applied to the quantum communication system 131, for example to further reduce coupling between different channels.

In an embodiment, Charlie's stabilisation subsystem 151 is further configured to provide a second phase reference signal (at a different wavelength than the first reference signal). In this case, Charlie's stabilisation subsystem 151 comprises a WDM to multiplex the first and second phase reference light. Alice's and Bob's stabilisation subsystems 143 may be further configured to send the received second phase reference light back to Charlie. Charlie's stabilisation subsystem 151 is further configured to perform a phase measurement on the received second phase reference light to determine phase shifts caused by the multimode fibres 139, 141. Charlie (via the classical communication module 25) sends to Alice and Bob (i.e. to Alice's and Bob's classical communication devices 15) the data specifying the determined phase shifts so that Alice and Bob can adjust their quantum transmitter 138 to correct for the phase shifts.

Whilst the embodiments of FIGS. 2 to 10 have been described in the context of QKD, it is understood that the above described techniques can be applied to another types of quantum communication. For example, the above described techniques relating to mode group division multiplexing may be applied to connect quantum memories and/or quantum computers. Connecting quantum memories and/or quantum computers typically requires various channels (carrying quantum signals, classical signals, optical references, and the like) between separate geographical locations. Mode group division multiplexing using the above described optical mode converters and multiplexers (with or without addition to wavelength division multiplexing) can reduce the number of independent fibres that are needed to connect the multiple locations.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An optical communication system comprising:
a first transmitter optically coupled to a first single-mode optical channel;
a second transmitter optically coupled to a second single-mode optical channel:
a multimode optical fibre configured to support transmission of a plurality of guided modes, the plurality of guided modes comprising a first and a second group of guided modes, a coupling between modes of the same mode group being stronger than a coupling between modes of different mode groups; and
an optical mode converter configured to optically i) couple the mode of the first single-mode optical channel to a mode of the first group of modes of the multimode fibre by gradually changing a transverse profile of propagating light received from the channel to match a transverse profile of the mode of the first group of modes of the multimode fibre and ii) optically couple the mode of the second channel to a mode of the second group of modes of the multimode fibre such that the first and second optical channels are optically coupled to modes of different groups of guided modes of the multimode fibre.

2. The optical communication system of claim 1, wherein the optical mode converter is configured to optically couple the mode of the first single-mode optical channel to the mode of the first group of modes of the multimode fibre with a selectivity of at least 5 dB.

3. The optical communication system of claim 1 configured to transmit a plurality of signals using wavelength division multiplexing.

4. The optical communication system of claim 3, wherein the plurality of wavelength division multiplexed signals comprises quantum signals having a first wavelength and classical signals having a different wavelength.

5. The optical communication system of claim 1, wherein the guided modes of the multimode fibre are linearly polarized modes characterised by an azimuthal order ν and a radial order μ, the modes of the first mode group are associated with a first mode number, the modes of the second mode group are associated with a second mode number different from the first mode number, and the respective mode numbers satisfy the equation $m=\nu+2\mu+1$.

6. The optical communication system of claim 1 wherein a relative difference between propagation constants of any two modes of the same mode group is equal to or less than 0.02%.

7. The optical communication system of claim 1, wherein the first transmitter is a quantum transmitter configured to provide quantum signals and comprising a pulsed laser, and the second transmitter is a classical communication device.

8. The optical communication system of claim 7 further comprising one or more further transmitters, each optically coupled to a further single-mode optical channel, wherein the multimode optical fibre is further configured to support transmission of corresponding one or more groups of guided modes, and wherein the optical mode converter is configured to optically couple each further channel to modes of different groups of guided modes of the multimode fibre.

9. The optical communication system of claim 7 further comprising:

for each transmitter a corresponding receiver optically coupled to a respective single-mode optical channel; and a second optical mode converter configured to optically couple the modes of the optical channels coupled to the transmitters to modes of different groups of guided modes of the multimode fibre so that each transmitter may receive optical signals from the corresponding transmitter.

10. The optical communication system of claim 9, wherein the optical communication system is configured to implement a quantum key distribution protocol, and wherein the classical communication device and the corresponding receiver are configured to exchange data signals for deriving a shared encryption key.

11. The optical communication system of claim 10, wherein one of the one or more further transmitters is a second classical communication device configured to transmit a reference signal to the corresponding receiver configured to process the received reference signal to adjust a setting of the quantum transmitter, and wherein the quantum transmitter is configured to provide quantum states based on the adjusted setting.

12. The optical communication system of claim 1, wherein the mode of the first group of modes is a fundamental mode of the multimode fibre.

13. The optical communication system of claim 1, wherein the optical mode converter comprises a tapered waveguide or a tapered waveguide array.

14. The optical communication system of claim 1, wherein the optical mode converter comprises micro-optic lenses.

15. The optical communication system of claim 1, wherein the multimode fibre is one of a step-index multimode fibre, a graded-index multimode fibre, a hollow core fibre, or a micro-structured optical fibre.

* * * * *